(12) United States Patent
Hoshina et al.

(10) Patent No.: US 9,847,689 B2
(45) Date of Patent: Dec. 19, 2017

(54) MOTOR

(71) Applicant: NIDEC SANKYO CORPORATION, Nagano (JP)

(72) Inventors: Tetsuo Hoshina, Nagano (JP); Shigeru Kasai, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 230 days.

(21) Appl. No.: 14/896,669

(22) PCT Filed: Jun. 9, 2014

(86) PCT No.: PCT/JP2014/065221
§ 371 (c)(1),
(2) Date: Dec. 8, 2015

(87) PCT Pub. No.: WO2014/199946
PCT Pub. Date: Dec. 18, 2014

(65) Prior Publication Data
US 2016/0134166 A1 May 12, 2016

(30) Foreign Application Priority Data

Jun. 12, 2013 (JP) ................................. 2013-123286

(51) Int. Cl.
*H02K 37/00* (2006.01)
*H02K 3/32* (2006.01)
(Continued)

(52) U.S. Cl.
CPC ............. *H02K 3/325* (2013.01); *G04C 3/008* (2013.01); *G04C 3/14* (2013.01); *H02K 1/146* (2013.01);
(Continued)

(58) Field of Classification Search
CPC .......... H02K 3/325; H02K 1/146; H02K 3/28; H02K 21/16; H02K 37/14; H02K 1/14; H02K 7/116
(Continued)

(56) References Cited

U.S. PATENT DOCUMENTS 2,477,993 A * 8/1949 Lewis .................. G06M 1/107
246/125
3,978,356 A 8/1976 Spiesberger
(Continued)

FOREIGN PATENT DOCUMENTS

DE 2208854 9/1973
FR 2843501 2/2004
(Continued)

OTHER PUBLICATIONS

"Search Report of Europe Counterpart Application", dated Nov. 3, 2016, p. 1-p. 10.
(Continued)

*Primary Examiner* — Thanh Lam
(74) *Attorney, Agent, or Firm* — JCIPRNET (57) ABSTRACT

In a motor, a magnet is configured so that four pairs of S-poles and N-poles are formed at equal angular intervals, and a stator core has six salient poles formed thereon. Of the plurality of salient poles, when the first salient pole or the second salient pole faces a position between an S-pole and an N-pole, the other salient pole faces the center of an S-pole or the center of an N-pole. The radial-direction lengths of the first salient pole and the second salient pole among the plurality of salient poles are longer than the other salient poles, and the radial-direction length of the portion of the first coil wound around the first salient pole and the radial-direction length of the portion of the second coil wound
(Continued)

around the second salient pole are longer than the radial-direction lengths of the other salient poles.

13 Claims, 5 Drawing Sheets

(51) Int. Cl.
| | |
|---|---|
| G04C 3/14 | (2006.01) |
| G04C 3/00 | (2006.01) |
| H02K 21/16 | (2006.01) |
| H02K 37/14 | (2006.01) |
| H02K 1/14 | (2006.01) |
| H02K 3/28 | (2006.01) |
| H02K 7/116 | (2006.01) |

(52) U.S. Cl.
CPC .............. *H02K 3/28* (2013.01); *H02K 21/16* (2013.01); *H02K 37/14* (2013.01); *H02K 1/14* (2013.01); *H02K 7/116* (2013.01)

(58) Field of Classification Search
USPC .............................. 310/49.01–49.55, 40 MM
See application file for complete search history.

(56) References Cited

U.S. PATENT DOCUMENTS

| 4,031,419 A * | 6/1977 | Spiesberger | H02K 21/16 310/156.42 |
|---|---|---|---|
| 4,088,909 A * | 5/1978 | Matsumura | H02K 37/16 310/163 |
| 2002/0135243 A1* | 9/2002 | Kotani | H02K 1/141 310/49.24 |
| 2003/0201677 A1* | 10/2003 | Feng | H02K 16/04 310/49.37 |
| 2006/0097588 A1* | 5/2006 | Nakane | H02K 1/185 310/49.01 |
| 2012/0200180 A1* | 8/2012 | Mizumaki | H02K 37/14 310/49.01 |

FOREIGN PATENT DOCUMENTS

| FR | 2899396 | 10/2007 |
|---|---|---|
| JP | 2002-354777 | 12/2002 |
| JP | 2003-111379 | 4/2003 |
| JP | 2006-141126 | 6/2006 |
| JP | 2008-161053 | 7/2008 |
| JP | 4125371 | 7/2008 |
| JP | 2013-57567 | 3/2013 |

OTHER PUBLICATIONS

"International Search Report (Form PCT/ISA/210) of PCT/JP2014/065221", dated Sep. 2, 2014, with English translation thereof, pp. 1-4.

* cited by examiner

MOTOR

CROSS-REFERENCE TO RELATED APPLICATION

This application is a 371 of international application of PCT application Ser. No. PCT/JP2014/065221, filed on Jun. 9, 2014, which claims the priority benefit of Japan application no. 2013-123286, filed on Jun. 12, 2013. The entirety of each of the above mentioned patent applications is hereby incorporated by reference herein and made a part of this specification.

FIELD OF THE INVENTION

The present invention relates to a motor in which a coil is wound around two of a plurality of salient poles of a stator core provided along a peripheral face of a magnet.

BACKGROUND ART

A display device such as a meter device for a vehicle or a clock may adopt a structure that a pointer is attached to an output shaft of a motor (see Patent Literature 1).

A motor used in the display device has been proposed which has a structure that a plurality of salient poles of a stator core is disposed along a peripheral face of a magnet and a coil is wound around two of the plurality of the salient poles (see Patent Literature 2). In the motor described in Patent Literature 2, three pairs or five pairs of "S"-poles and "N"-poles are disposed on an outer peripheral face of a magnet, the number of salient poles is set to be eight, and a coil is wound around two salient poles whose angular positions are shifted by 90° from each other.

CITATION LIST

Patent Literature

[PTL 1] Japanese Patent Laid-Open No. 2013-57567
[PTL 2] Japanese Patent No. 4125371

SUMMARY OF THE INVENTION

Technical Problem

In a motor which is used in a display device described in Patent Literature 1 and the like, it is required, in addition to obtaining a sufficient excitation torque, to reduce volume of sound which is generated when a rotor is accelerated or decelerated. However, the motor described in Patent Literature 2 is unable to meet the requirement sufficiently.

In view of the problem described above, an objective of the present invention is to provide a motor which is capable of reducing volume of sound which is generated when a rotor is accelerated or decelerated.

Solution to Problem

To achieve the above mentioned objective, the present invention provides a motor including a rotor having a magnet whose peripheral face is alternately provided with an "S"-pole and an "N"-pole in a circumferential direction at equal angular intervals, and a stator having a stator core in which a plurality of salient poles facing the peripheral face through a gap space is disposed in the circumferential direction, a first coil which is wound around a first salient pole of the plurality of the salient poles, and a second coil which is wound around a second salient pole separated from the first salient pole in the circumferential direction of the plurality of the salient poles. The magnet is provided with four pairs of the "S"-poles and the "N"-poles and the stator core is formed with six pieces of the salient poles. In addition, the first salient pole and the second salient pole are disposed so that, when one salient pole faces between the "S"-pole and the "N"-poles, the other salient pole faces a center of the "S"-pole or a center of the "N"-pole.

In the motor in accordance with the present invention, the magnet is provided with four pairs of the "S"-poles and the "N"-poles at equal angular intervals and the stator core is formed with six pieces of the salient poles. In this structure, if the salient poles are disposed at equal angular intervals, an excitation torque which is sufficient for rotation of the rotor cannot be obtained. However, according to the present invention, the first salient pole of the plurality of the salient poles around which the first coil is wound and the second salient pole of the plurality of the salient poles around which the second coil is wound are disposed so that, when one salient pole faces between the "S"-pole and the "N"-poles, the other salient pole faces a center of the "S"-pole or a center of the "N"-pole. Therefore, an excitation torque which is sufficient for rotation of the rotor can be obtained. Further, when variation of a detent torque with respect to an electrical angle is inspected in the motor having this structure, variation of the detent torque of this motor is smaller than those of the motors in which the magnet is formed with three pairs or five pairs of "S"-poles and "N"-poles and the stator core is formed with eight salient poles. Therefore, vibration of the rotor is reduced and thus volume of sound which is generated when the rotor is accelerated or decelerated can be reduced and noise is reduced.

In the present invention, it may be structured that angular positions of the first salient pole and the second salient pole are shifted from each other by 112.5° in the circumferential direction. According to this structure, in the six salient poles, the first salient pole around which the first coil is wound and the second salient pole around which the second coil is wound are structured so that, when one salient pole faces between an "S"-pole and an "N"-pole, the other salient pole faces the center of an "S"-pole or the center of an "N"-pole.

In the present invention, it is preferable that the stator core is structured by laminating a plurality of magnetic plates. According to this structure, even when the stator core is provided with many salient poles, a magnetic plate is thin when the magnetic plate is punched out in a shape of the stator core and thus the magnetic plate can be efficiently punched out with a high degree of accuracy.

In the present invention, it is preferable that dimensions in a radial direction of the first salient pole and the second salient pole are longer than dimensions of the other salient poles, and a dimension in the radial direction of a winding portion of the first coil for the first salient pole and a dimension in the radial direction of a winding portion of the second coil for the second salient pole are longer than the dimensions in the radial direction of the other salient poles. According to this structure, the winding number of the coil can be secured sufficiently.

In the present invention, it is preferable that the motor includes a reduction gear mechanism through which rotation of the rotor is decelerated and transmitted. According to this structure, the reduction gear mechanism is not required to provide outside the motor.

Effects of the Invention

In the motor in accordance with the present invention, the magnet is provided with four pairs of the "S"-poles and the "N"-poles at equal angular intervals and the stator core is formed with six pieces of the salient poles. In this structure, if the salient poles are disposed at equal angular intervals, an excitation torque which is sufficient for rotation of the rotor cannot be obtained. However, according to the present invention, in the plurality of the salient poles, the first salient pole around which the first coil is wound and the second salient pole around which the second coil is wound are disposed so that, when one salient pole faces between the "S"-pole and the "N"-poles, the other salient pole faces a center of the "S"-pole or a center of the "N"-pole. Therefore, an excitation torque which is sufficient for rotation of the rotor can be obtained. Further, when variation of a detent torque with respect to an electrical angle is inspected in the motor having this structure, variation of the detent torque of this motor is smaller than those of the motors in which the magnet is formed with three pairs or five pairs of "S"-poles and "N"-poles and the stator core is formed with eight salient poles. Therefore, vibration of the rotor is reduced and thus volume of sound which is generated when the rotor is accelerated or decelerated can be reduced and noise is reduced.

DESCRIPTION OF THE EMBODIMENTS

A motor to which the present invention is applied will be described below with reference to the accompanying drawings.

(Description of Motor)

Figure 1A:
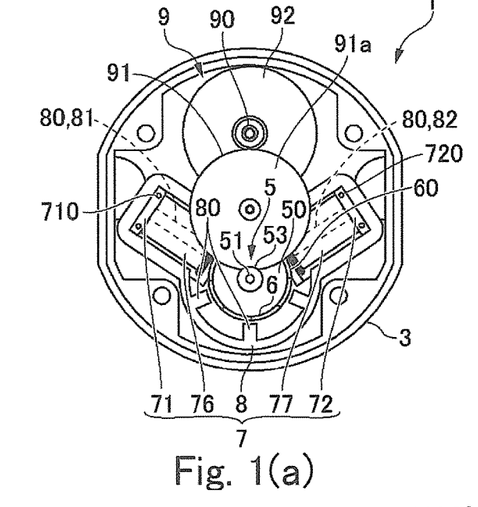
FIGS. 1(a), 1(b) and 1(c) are explanatory views showing a motor to which the present invention is applied.
Figure 1B:
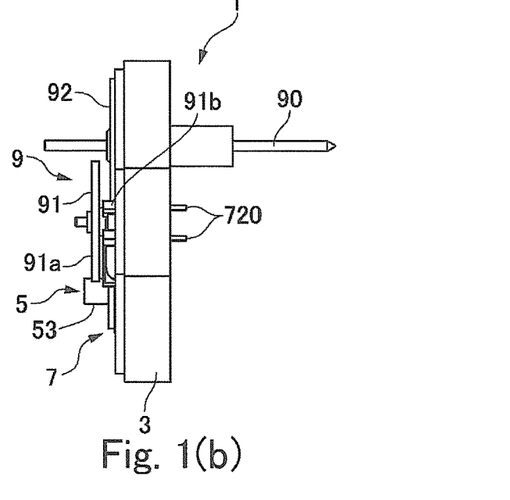
Figure 1C:
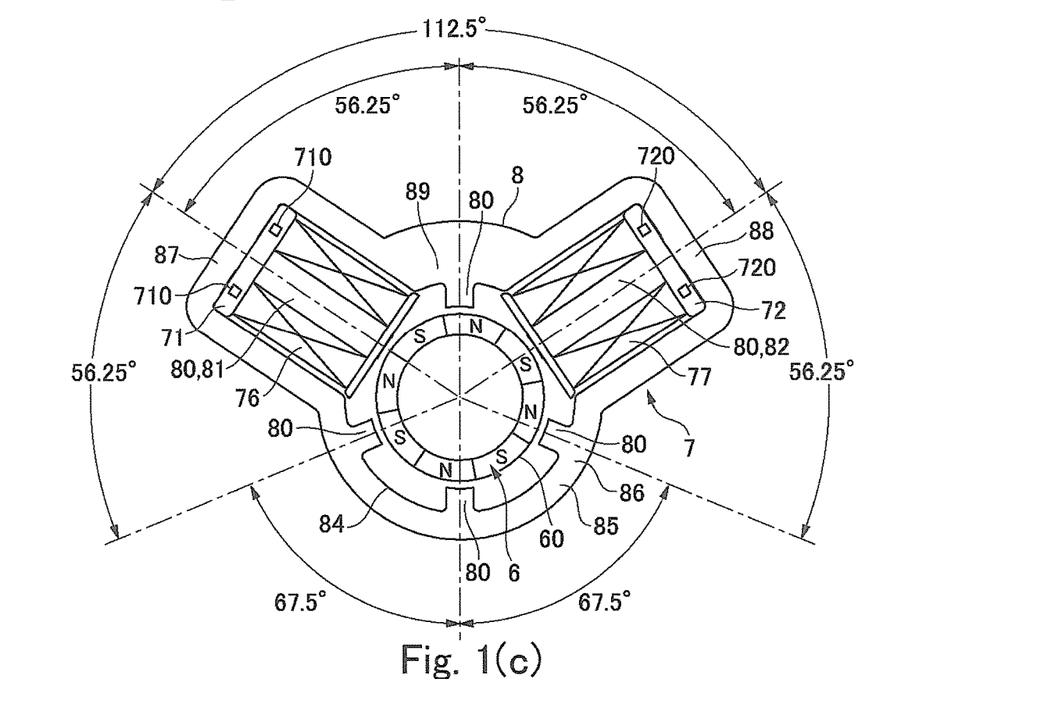

FIGS. 1(a), 1(b) and 1(c) are explanatory views showing a motor to which the present invention is applied. FIG. 1(a) is a plan view showing the motor, FIG. 1(b) is a side view showing the motor, and FIG. 1(c) is a plan view showing a stator and the like.

As shown in FIGS. 1(a) and 1(b), a motor 1 in this embodiment includes a case 3, a rotor 5 rotatably supported by the case 3, and a stator 7 disposed around the rotor 5. In this embodiment, a support shaft 51 is fixed to the case 3 and the rotor 5 is rotatably supported by the support shaft 51. Therefore, the rotor 5 is rotatably supported by the case 3 through the support shaft 51. Further, the motor 1 includes a reduction gear mechanism 9 structured to decelerate and transmit rotation of the rotor 5 to an output shaft 90 and the reduction gear mechanism 9 is also supported by the case 3 similarly to the rotor 5 and the stator 7.

The rotor 5 includes a pinion 53 rotatably supported by the support shaft 51 and a cylindrical shaped magnet 6 which is integrated with the pinion 53. In this embodiment, the magnet 6 and the pinion 53 are integrated with each other by insert molding. Therefore, the magnet 6 and the pinion 53 are connected with each other through a circular plate part 50 made of resin. In this embodiment, the magnet 6 is a ferrite magnet.

The stator 7 includes a stator core 8 provided with a plurality of salient poles 80 facing an outer peripheral face 60 (peripheral face) of the magnet 6 through a gap space, a first coil 76 wound around a first salient pole 81 of the plurality of the salient poles 80 through an insulator 71, and a second coil 77 wound around a second salient pole 82 of the plurality of the salient poles 80 through an insulator 72. An end part of the insulator 71 holds two power supplying terminals 710 for the first coil 76 and an end part of the insulator 72 holds two power supplying terminals 720 for the second coil 77. The terminals 710 and 720 are bound with end parts of a winding start and a winding end of the first coil 76 and end parts of a winding start and a winding end of the second coil 77.

The reduction gear mechanism 9 includes a first gear 91 which is provided with a large diameter gear 91a engaged with the pinion 53 and a second gear 92 having a large diameter which is engaged with a small diameter gear 91b of the first gear 91. An output shaft 90 is fixed to the second gear 92.

In the motor 1 structured as described above, when drive pulses having respective phases are supplied to the first coil 76 and the second coil 77 through the terminals 710 and 720, the rotor 5 is rotated. The rotation of the rotor 5 is transmitted to the output shaft 90 through the reduction gear mechanism 9. Further, in a case that a pointer type display device is structured by using the motor 1, a pointer (not shown) is fixed to the output shaft 90. In the display device, an angular position of the pointer is changed by drive pulses supplied to the first coil 76 and the second coil 77 through the terminals 710 and 720. In this case, drive pulses for positive rotation are supplied to the terminals 710 and 720 and, after the pointer is turned to a target position in a clockwise direction, when drive pulses for stopping are supplied to the terminals 710 and 720, the pointer is stopped at the target position. Further, in this state, when drive pulses for reverse rotation are supplied to the terminals 710 and 720, the pointer can be turned to another target position in the counterclockwise direction.

(Structures of Magnet 6 and Stator Core 8)

As shown in FIG. 1(c), in the motor 1 in this embodiment, the magnet 6 is alternately provided with "S"-poles and "N"-poles with equal angular intervals on an outer peripheral face 60 in a circumferential direction. In this embodiment, the magnet 6 is formed with four pairs of "S"-poles and "N"-poles. Therefore, in the magnet 6, totaled 8 poles of an "S"-pole and an "N"-pole are formed with equal angular intervals and thus angular positions of an "S"-pole and an "N"-pole adjacent to each other are shifted by 45° in the circumferential direction.

The stator core 8 is provided with an opening part 84 in a portion where the magnet 6 is disposed. A plurality of salient poles 80 which are protruded from an inner peripheral edge of the opening part 84 toward the outer peripheral face 60 of the magnet 6 is disposed in a circumferential direction. An end part on an inner side in a radial direction of the salient pole 80 faces the outer peripheral face 60 of the magnet 6 through a gap space. Gap space dimensions between the end parts on the inner sides in the radial direction of the salient poles 80 and the outer peripheral face 60 of the magnet 6 are equal to each other in all of the plurality of the salient poles 80. In this embodiment, the number of the salient poles 80 is six.

In this embodiment, the salient poles 80 are disposed at unequal intervals. However, the first salient pole 81 around which the first coil 76 is wound and the second salient pole 82 around which the second coil 77 is wound are disposed so that, when the center in a circumferential direction of one salient pole faces a position between an "S"-pole and an "N"-pole, in other words, the center faces a boundary portion between an "S"-pole and an "N"-pole, the center in the circumferential direction of the other salient pole faces the center in the circumferential direction of an "S"-pole or faces the center in the circumferential direction of an "N"-pole. More specifically, in a plurality of the salient poles 80, two salient poles 80 whose angular positions are shifted by 112.5° in the circumferential direction are utilized as the first salient pole 81 and the second salient pole 82. In other words, in a plurality of the salient poles 80, one of two salient poles 80 whose angular positions are shifted by 112.5° is the first salient pole 81 to which the insulator 71 in a tube shape around which the first coil 76 is wound is fitted on its outer side, and the other is the second salient pole 82 to which the insulator 72 in a tube shape around which the second coil 77 is wound is fitted on its outer side. In this embodiment, the expression that the angular positions of the first salient pole 81 and the second salient pole 82 are shifted by 112.5° means that angular positions of the center in a circumferential direction of the first salient pole 81 and the center in the circumferential direction of the second salient pole 82 are shifted by 112.5°. Further, one salient pole 80 around which a coil is not wound exists between the first salient pole 81 and the second salient pole 82. Therefore, respective intervals of the salient poles 80 adjacent to each other in a circumferential direction are 56.25°, 56.25°, 56.25°, 67.5°, 67.5° and 56.25° in a clockwise direction with the first salient pole 81 as a starting point in FIG. 1(*c*).

In this embodiment, in a plurality of the salient poles 80, the first salient pole 81 and the second salient pole 82 have longer dimensions in a radial direction than other salient poles 80. Therefore, a dimension in the radial direction of a winding portion of the first coil 76 for the first salient pole 81 and a dimension in the radial direction of a winding portion of the second coil 77 for the second salient pole 82 are longer than dimensions in the radial direction of other salient poles 80. The dimensions in the radial direction of the first salient pole 81 and the second salient pole 82 are equal to each other, and the dimension in the radial direction of the winding portion of the first coil 76 for the first salient pole 81 and the dimension in the radial direction of the winding portion of the second coil 77 for the second salient pole 82 are equal to each other.

In a plurality of the salient poles 80, the dimensions in the radial direction of all the salient poles 80 other than the first salient pole 81 and the second salient pole 82 are equal to each other, in other words, all the length dimensions of the salient poles 80 protruded from a connecting part 85 described below toward the outer peripheral face 60 of the magnet 6 are the same as each other. Therefore, outer side end parts in the radial direction of the salient poles 80 other than the first salient pole 81 and the second salient pole 82 are located at the same distance positions from the magnet 6. On the other hand, the dimensions in the radial direction of the first salient pole 81 and the second salient pole 82 are longer than those of other salient poles 80 and thus an outer side end part in the radial direction of the first salient pole 81 and an outer side end part in the radial direction of the second salient pole 82 are located at separated positions from the magnet 6 to outer sides in the radial direction relative to the outer side end parts in the radial direction of other salient poles 80.

The stator core 8 is provided with a frame-shaped connecting part 85 which connect all the outer side end parts in the radial direction of the salient poles 80 including the first salient pole 81 and the second salient pole 82. A width dimension of the connecting part 85 is substantially the same over the whole periphery. Therefore, the connecting part 85 is formed to be a circular arc part 86 which is concentric with the magnet 6 except an angular range where the first salient pole 81 and the second salient pole 82 are formed. On the other hand, the connecting part 85 is provided with a rectangular part 87 which is protruded in a rectangular frame shape to an outer side in the radial direction over an angular range where the first salient pole 81 is formed, and the connecting part 85 is provided with a rectangular part 88 which is protruded in a rectangular frame shape to an outer side in the radial direction over an angular range where the second salient pole 82 is formed. Therefore, a portion 89 between the rectangular parts 87 and 88 is formed in a shape which is recessed to an inner side in the radial direction. However, the portion 89 between the rectangular parts 87 and 88 is also formed in a circular arc shape. In the connecting part 85, a width dimension of the circular arc part 86 and width dimensions of the rectangular parts 87 and 88 are the same as each other, but a width dimension of the portion 89 between the rectangular parts 87 and 88 is set to be wider than the width dimension of the circular arc part 86 and the width dimensions of the rectangular parts 87 and 88.

In this embodiment, the stator core 8 is formed in a plate shape and is structured of a plurality of laminated magnetic plates which are punched out in the above-mentioned shape.

(Evaluation Results of Motor 1)

Figure 2A:
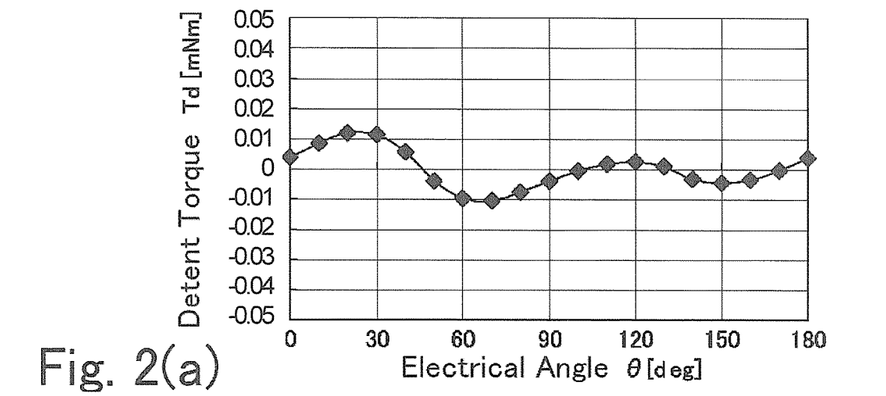
FIGS. 2(a), 2(b) and 2(c) are graphs showing simulation results of characteristics of a motor to which the present invention is applied.
Figure 2B:
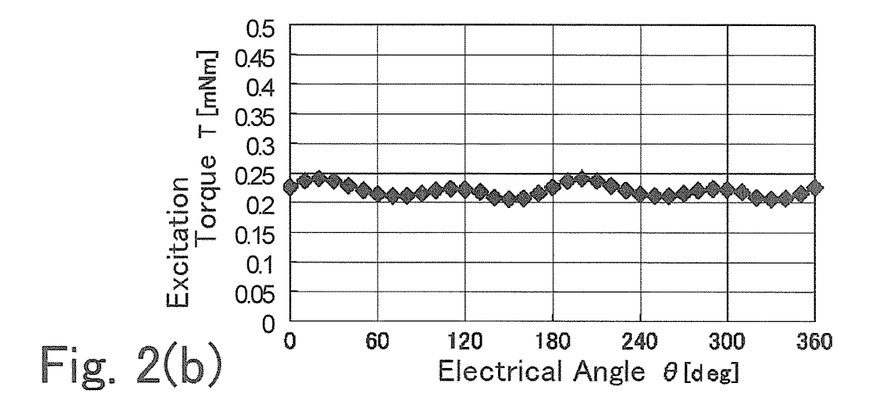
Figure 2C:
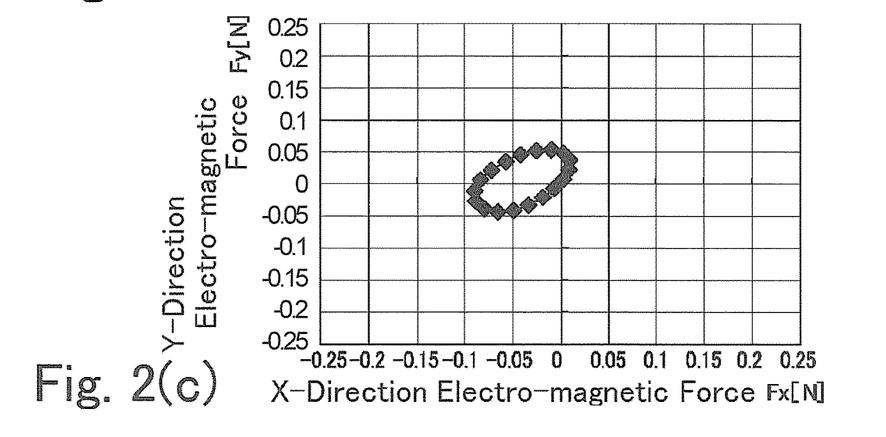

FIGS. 2(*a*), 2(*b*) and 2(*c*) are graphs showing results obtained by simulation of characteristics of the motor 1 to which the present invention is applied. FIG. 2(*a*) is a graph showing a relationship between an electrical angle and a detent torque of the motor 1, FIG. 2(*b*) is a graph showing a relationship between an electrical angle and an excitation torque of the motor 1, and FIG. 2(*c*) is a graph showing a Lissajous figure indicating electro-magnetic forces applied to the rotor 5 in the radial direction. In FIG. 2(*c*), one direction perpendicular to a rotation center axial line of the rotor 5 is set to be an "X"-axis direction and a force applied to the rotor 5 in the "X"-axis direction is shown in a horizontal axis. Further, in FIG. 2(*c*), a direction perpendicular to the rotation center axial line of the rotor 5 and the "X"-axis direction is set to be a "Y"-axis direction and a force applied to the rotor 5 in the "Y"-axis direction is shown in a vertical axis. The stator core 8 of the motor 1 used for evaluation is structured so that a non-directional electromagnetic steel plate whose thickness is 0.5 mm is punched out in the above-mentioned shape and three non-directional electromagnetic steel plates are laminated. An inner diameter of the magnet 6 is 6 mm, its outer diameter is 8 mm and its dimension in an axial line direction is 3 mm. The first coil 76 and the second coil 77 are respectively structured so that a coil wire whose diameter is 0.055 mm is wound around 2200 times and a resistance value for one phase is 220Ω. The drive voltage is 5V.

Figure 3A:
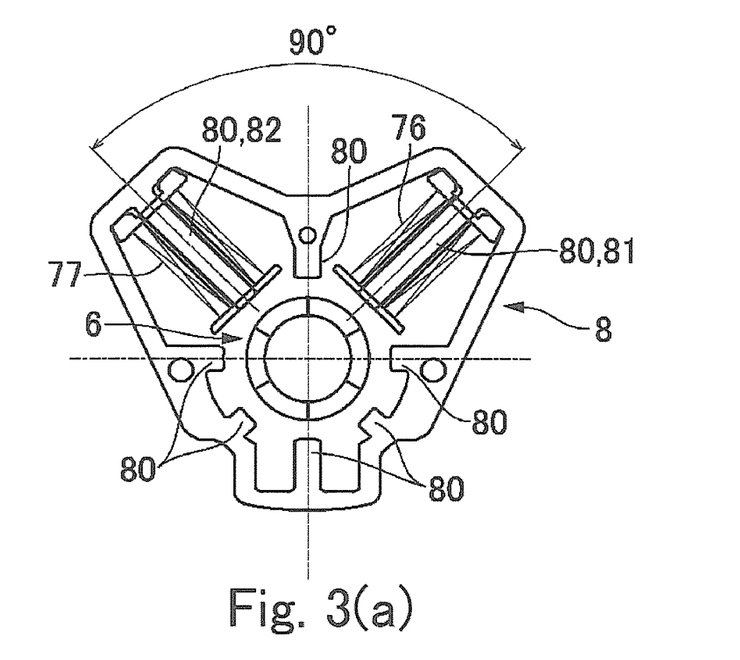
FIGS. 3(a) and 3(b) are explanatory views showing motors in comparative examples with the present invention.
Figure 3B:
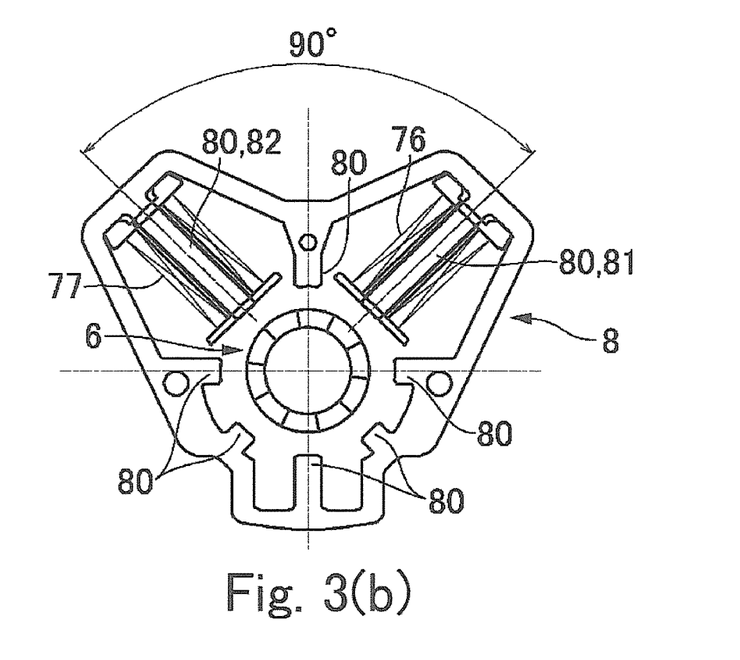

FIGS. 3(*a*) and 3(*b*) are explanatory views showing motors 1 in comparative examples with the present invention. Characteristics of these motors 1 are also obtained by simulation. In the motor in accordance with a first comparative example shown in FIG. 3(*a*), three pairs of "S"-poles and "N"-poles are formed in the magnet 6 and the stator core 8 is formed with eight salient poles 80 with equal angular intervals. Further, an angular position of the first salient pole 81 around which the first coil 76 is wound and an angular position of the second salient pole 82 around which the second coil 77 is wound are shifted by 90° from each other.

In the motor in accordance with a second comparative example shown in FIG. 3(b), five pairs of "S"-poles and "N"-poles are formed in the magnet 6 and the stator core 8 is formed with eight salient poles 80. Further, an angular position of the first salient pole 81 around which the first coil 76 is wound and an angular position of the second salient pole 82 around which the second coil 77 is wound are shifted by 90° from each other. In this embodiment, the salient poles 80 are formed at unequal intervals but, when the center in a circumferential direction of one of the first salient pole 81 and the second salient pole 82 faces a boundary portion between an "S"-pole and an "N"-pole, the other salient pole faces the center in the circumferential direction of an "S"-pole or the center in the circumferential direction of an "N"-pole and thus an excitation torque can be generated without any problem.

Figure 4A:
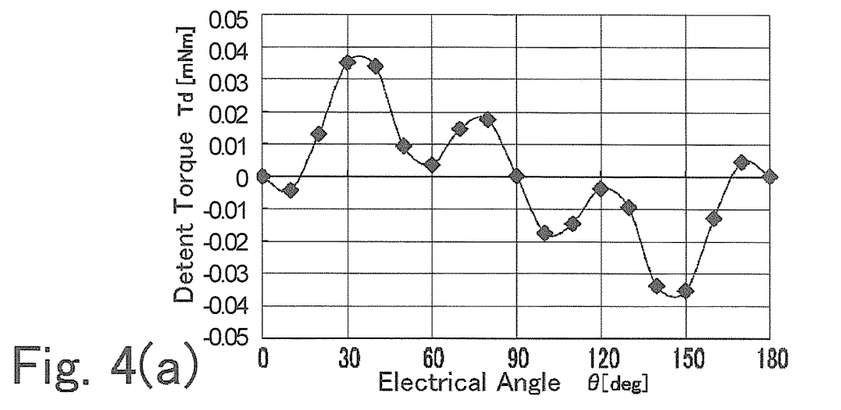
FIGS. 4(a), 4(b) and 4(c) are graphs showing simulation results of characteristics of a motor in a first comparative example shown in FIG. 3(a) with the present invention.
Figure 4B:
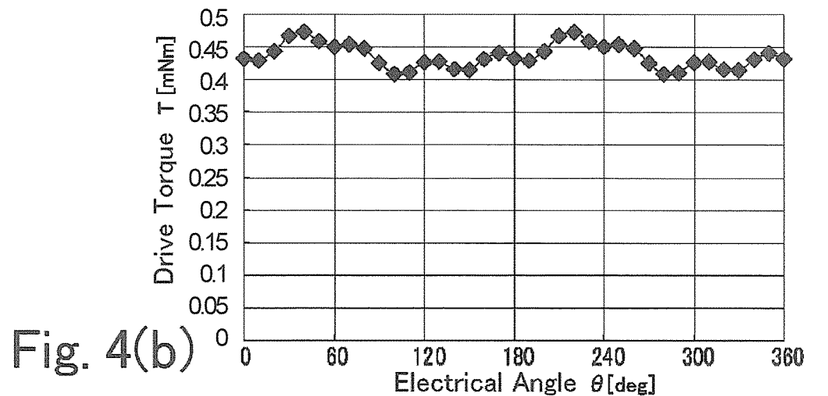
Figure 4C:
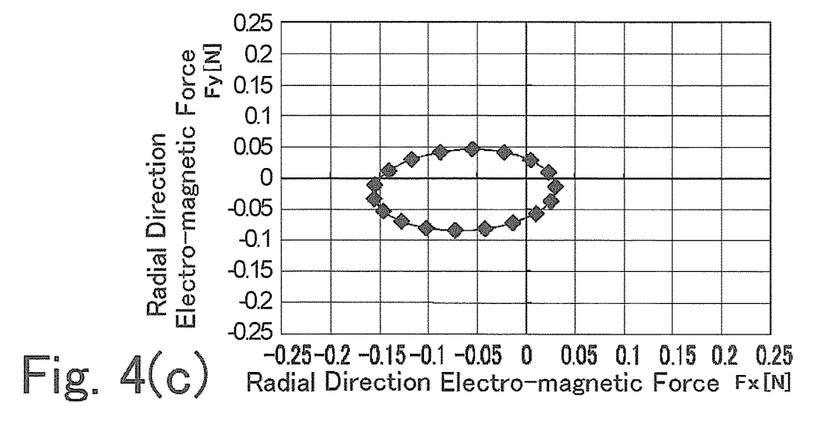
Figure 5A:
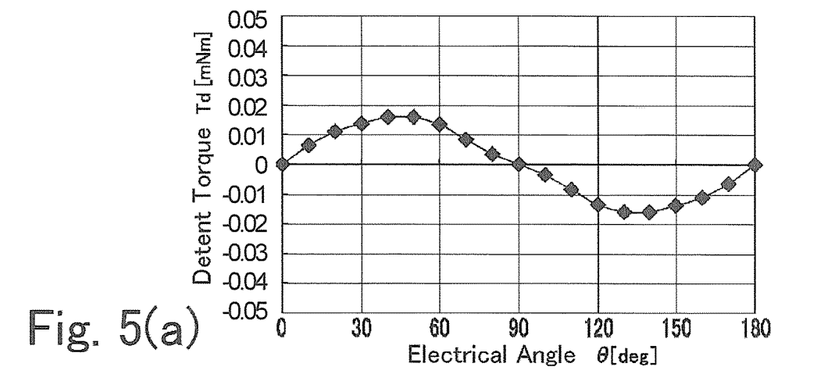
FIGS. 5(a), 5(b) and 5(c) are graphs showing simulation results of characteristics of a motor in a second comparative example shown in FIG. 3(b) with the present invention.
Figure 5B:
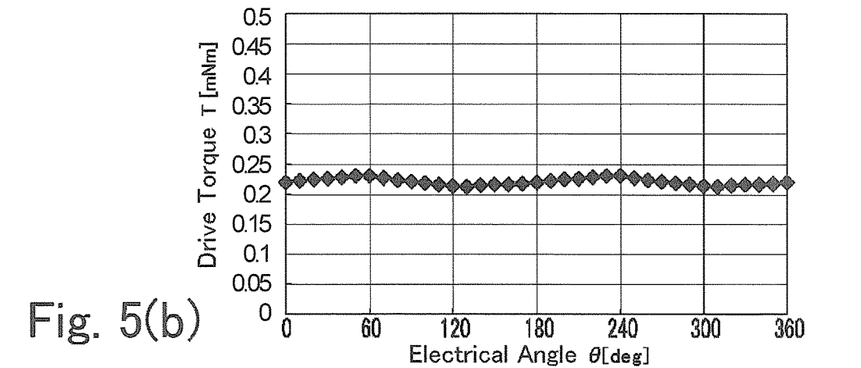
Figure 5C:
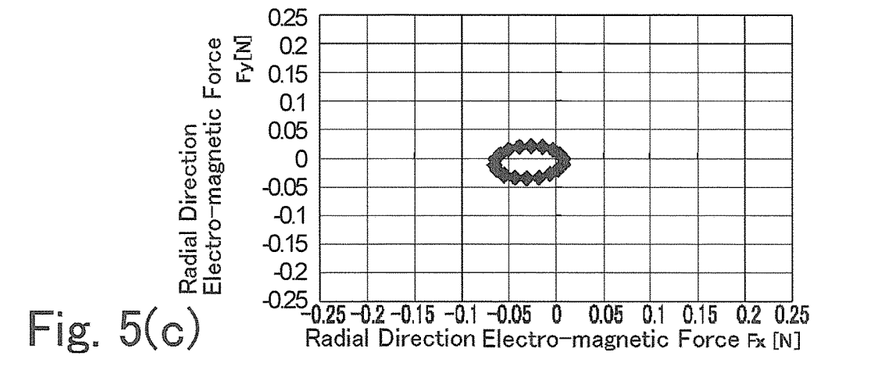

FIGS. 4(a), 4(b) and 4(c) are graphs showing results obtained by simulation of characteristics of the motor shown in FIG. 3(a) in the first comparative example with the present invention. FIG. 4(a) is a graph showing a relationship between an electrical angle and a detent torque of the motor, FIG. 4(b) is a graph showing a relationship between an electrical angle and a drive torque of the motor, and FIG. 4(c) is a graph showing a Lissajous figure indicating electromagnetic forces applied to the rotor 5 in the radial directions. FIGS. 5(a), 5(b) and 5(c) are graphs showing results obtained by simulation of characteristics of the motor shown in FIG. 3(b) in the second comparative example with the present invention. FIG. 5(a) is a graph showing a relationship between an electrical angle and a detent torque of the motor, FIG. 5(b) is a graph showing a relationship between an electrical angle and a drive torque of the motor, and FIG. 5(c) is a graph showing a Lissajous figure indicating electromagnetic forces applied to the rotor 5 in the radial directions.

FIG. 4(a) and FIG. 5(a) show data corresponding to FIG. 2(a), FIG. 4(b) and FIG. 5(b) show data corresponding to FIG. 2(b), and FIG. 4(c) and FIG. 5(c) show data corresponding to FIG. 2(c).

Basic structures such as a size of the magnet 6 and a size of the stator core 8 of the motor in accordance with the first comparative example shown in FIG. 3(a) and the motor in accordance with the second comparative example shown in FIG. 3(b) are the same as the motor 1 to which the present invention is applied and only the number of poles of the magnet 6 and the number of the salient poles 80 are different.

As understood by comparing the result shown in FIG. 2(a) with the result shown in FIG. 4(a) and the result shown in FIG. 5(a), in the motor 1 to which the present invention is applied, a variation amount of the detent torque is smaller than the motor in accordance with the first comparative example and the motor in accordance with the second comparative example. Therefore, an external force applied to the rotor 5 is small and thus vibration is reduced.

Next, as understood by comparing the result shown in FIG. 2(b) with the result shown in FIG. 4(b), in the motor 1 to which the present invention is applied, an excitation torque is smaller than that of the motor in accordance with the first comparative example. However, an excitation torque required to rotate the rotor 5 can be obtained sufficiently. Further, in the motor 1 to which the present invention is applied, variation of an excitation torque is slightly smaller than that of the motor in accordance with the first comparative example.

When the result shown in FIG. 2(b) and the result shown in FIG. 5(b) are compared with each other, levels of the excitation torques are substantially equal to each other. Further, variation of an excitation torque of the motor 1 to which the present invention is applied is slightly larger than that of the motor in accordance with the first comparative example. However, the difference is small and is regarded as equivalent.

As understood by comparing the result shown in FIG. 2(c) with the result shown in FIG. 4(c), in the motor 1 to which the present invention is applied, a force applied to the rotor 5 in the radial direction is smaller than that of the motor in accordance with the first comparative example. Therefore, in the motor 1 to which the present invention is applied, in comparison with the motor in accordance with the first comparative example, an external force applied to the rotor 5 is small and thus vibration is reduced.

When the result shown in FIG. 2(c) and the result shown in FIG. 5(c) are compared with each other, in the motor 1 to which the present invention is applied, a force applied to the rotor 5 in the radial direction is slightly larger than the motor in accordance with the first comparative example.

(Principal Effects in this Embodiment)

As described above, in the motor 1 in this embodiment, the magnet 6 is formed with four pairs of "S"-poles and "N"-poles at equal angular intervals and the stator core 8 is formed with six salient poles 80. In a case of this structure, when the salient poles 80 are disposed at equal angular intervals, an excitation torque which is sufficient for rotation of the rotor 5 cannot be obtained. However, in the stator core 8, in a plurality of the salient poles 80, the first salient pole 81 around which the first coil 76 is wound and the second salient pole 82 around which the second coil 77 is wound are disposed so that, when the center in a circumferential direction of one salient pole faces between an "S"-pole and an "N"-pole, the center in the circumferential direction of the other salient pole faces the center in the circumferential direction of an "S"-pole or the center in the circumferential direction of an "N"-pole. Therefore, an excitation torque which is sufficient for rotation of the rotor 5 can be obtained. Further, variation of a detent torque with respect to an electrical angle was inspected in the motor 1 having the above-mentioned structure. As a result, as described with reference to FIG. 2(a), FIG. 4(a) and FIG. 5(a), variation of a detent torque of the motor 1 in this embodiment is smaller than the motors in accordance with the first and second comparative examples in which the magnet 6 is formed with three pairs or five pairs of "S"-poles and "N"-poles and the stator core 8 is formed with eight salient poles 80. Therefore, in the motor 1 in this embodiment, vibration of the rotor 5 is reduced and thus volume of sound which is generated when the rotor 5 is accelerated or decelerated can be reduced and noise is reduced.

The stator core 8 is structured by laminating a plurality of magnetic plates. Therefore, even when the stator core 8 is provided with many salient poles 80 like this embodiment, a magnetic plate is thin when the magnetic plate is punched out in a shape of the stator core 8 and thus the magnetic plate can be punched out with a high degree of accuracy.

Further, in a plurality of the salient poles 80, dimensions in a radial direction of the first salient pole 81 and the second salient pole 82 are longer than those of other salient poles 80 and thus a dimension in the radial direction of a winding portion of the first coil 76 for the first salient pole 81 and a dimension in the radial direction of a winding portion of the second coil 77 for the second salient pole 82 are larger than the dimensions in the radial direction of other salient poles 80. Therefore, an excitation torque which is required to rotate the motor 1 can be obtained surely.

The motor 1 is provided with the reduction gear mechanism 9 by which rotation of the rotor 5 is decelerated and transmitted and thus the reduction gear mechanism 9 is not required to provide outside the motor 1. Therefore, when only a pointer is attached to the output shaft 90 of the motor 1 in this embodiment, a main part of a display device can be structured and the size of the display device can be reduced.

(Other Embodiments)

In the embodiment described above, it is structured that the rotor 5 is located to an inner side of the stator 7. However, the present invention may be applied to a motor in which the rotor 5 is located outside the stator 7. In this case, it is structured that the salient poles 80 are protruded to an outer side in a radial direction from the stator core 8 so as to face an inner peripheral face (peripheral face) of the magnet 6.

What is claimed is:

1. A motor comprising:
   a rotor comprising a magnet whose peripheral face is alternately provided with an "S"-pole and an "N"-pole in a circumferential direction at equal angular intervals; and
   a stator comprising:
   a stator core in which a plurality of salient poles facing the peripheral face through a gap space is disposed in the circumferential direction;
   a first coil which is wound around a first salient pole of the plurality of the salient poles; and
   a second coil which is wound around a second salient pole separated from the first salient pole in the circumferential direction of the plurality of the salient poles;
   wherein the magnet is provided with four pairs of the "S"-poles and the "N"-poles, and the stator core is formed with six pieces of the salient poles; and
   wherein the first salient pole and the second salient pole are disposed so that, when one salient pole faces between the "S"-pole and the "N"-pole, the other salient pole faces a center of the "S"-pole or a center of the "N"-pole.

2. The motor according to claim 1, wherein angular positions of the first salient pole and the second salient pole are shifted from each other by 112.5° in the circumferential direction.

3. The motor according to claim 2, wherein the stator core is structured by laminating a plurality of magnetic plates.

4. The motor according to claim 3, wherein
   dimensions in a radial direction of the first salient pole and the second salient pole are longer than dimensions of the other salient poles, and
   a dimension in the radial direction of a winding portion of the first coil for the first salient pole and a dimension in the radial direction of a winding portion of the second coil for the second salient pole are longer than the dimensions in the radial direction of the other salient poles.

5. The motor according to claim 4, further comprising a reduction gear mechanism through which rotation of the rotor is decelerated and transmitted.

6. The motor according to claim 1, wherein the stator core is structured by laminating a plurality of magnetic plates.

7. The motor according to claim 1, wherein
   dimensions in a radial direction of the first salient pole and the second salient pole are longer than dimensions of the other salient poles, and
   a dimension in the radial direction of a winding portion of the first coil for the first salient pole and a dimension in the radial direction of a winding portion of the second coil for the second salient pole are longer than the dimensions in the radial direction of the other salient poles.

8. The motor according to claim 7, wherein angular positions of the first salient pole and the second salient pole are shifted from each other by 112.5° in the circumferential direction.

9. The motor according to claim 1, further comprising a reduction gear mechanism through which rotation of the rotor is decelerated and transmitted.

10. The motor according to claim 9, wherein
    dimensions in a radial direction of the first salient pole and the second salient pole are longer than dimensions of the other salient poles, and
    a dimension in the radial direction of a winding portion of the first coil for the first salient pole and a dimension in the radial direction of a winding portion of the second coil for the second salient pole are longer than the dimensions in the radial direction of the other salient poles.

11. The motor according to claim 10, wherein angular positions of the first salient pole and the second salient pole are shifted from each other by 112.5° in the circumferential direction.

12. The motor according to claim 11, wherein
    the reduction gear mechanism comprises:
    a pinion which is provided in the rotor;
    a first gear having a large diameter gear engaged with the pinion; and
    a second gear having a large diameter which is engaged with a small diameter gear of the first gear;
    wherein an output shaft is fixed to the second gear, and
    wherein the first gear and the second gear are disposed between the first salient pole and the second salient pole in the circumferential direction.

13. The motor according to claim 9, wherein
    the reduction gear mechanism comprises:
    a pinion which is provided in the rotor;
    a first gear having a large diameter gear engaged with the pinion; and
    a second gear having a large diameter which is engaged with a small diameter gear of the first gear;
    wherein an output shaft is fixed to the second gear,
    wherein one salient pole of the plurality of the salient poles where a coil is not wound exists between the first salient pole and the second salient pole, and
    wherein the first gear and the second gear are disposed on a side of the one salient pole where a coil is not wound with respect to the pinion.

* * * * *